United States Patent [19]
Canning et al.

[11] Patent Number: 5,830,622
[45] Date of Patent: Nov. 3, 1998

[54] OPTICAL GRATING

[75] Inventors: John Canning, Newton; Mark Sceats, Five Dock, both of Australia

[73] Assignee: The University of Sydney, Sydney, Australia

[21] Appl. No.: 693,178

[22] PCT Filed: Feb. 14, 1995

[86] PCT No.: PCT/AU95/00069

§ 371 Date: Oct. 4, 1996

§ 102(e) Date: Oct. 4, 1996

[87] PCT Pub. No.: WO95/22068

PCT Pub. Date: Aug. 17, 1995

[30] Foreign Application Priority Data

Feb. 14, 1994 [AU] Australia ................................ PM3867

[51] Int. Cl.$^6$ .............................. G02B 6/10; G02B 27/44
[52] U.S. Cl. ......................... 430/321; 430/945; 430/394; 385/37; 372/96; 372/102
[58] Field of Search ..................................... 430/320, 945, 430/321, 394; 385/37; 372/96, 102

[56] References Cited

U.S. PATENT DOCUMENTS

| | | | |
|---|---|---|---|
| 4,750,801 | 6/1988 | Alferness | 385/37 |
| 4,815,800 | 3/1989 | Chern et al. | 359/3 |
| 5,237,576 | 8/1993 | DiGiovanni et al. | 372/6 |
| 5,305,336 | 4/1994 | Adar et al. | 372/96 |
| 5,309,260 | 5/1994 | Mizrahi et al. | 359/3 |
| 5,327,515 | 7/1994 | Anderson et al. | 385/123 |

FOREIGN PATENT DOCUMENTS

| | | |
|---|---|---|
| 26518/71 | 3/1971 | Australia . |
| 0 506 546 A2 | 9/1992 | European Pat. Off. . |
| 0 635 736 A1 | 1/1995 | European Pat. Off. . |
| 55-110207 | 8/1980 | Japan . |
| 2 272 075 | 5/1994 | United Kingdom . |
| WO 86/01303 | 2/1986 | WIPO . |
| WO 93/18420 | 9/1993 | WIPO . |

OTHER PUBLICATIONS

Eggleton, B.J. et al., "Long Periodic Superstructure Bragg Gratings in Optical Fibres", *Electronics Letters*, 30(19): 1620–1622 (Sep. 15, 1994).

Farries, M.C., et al., "Very Broad Reflection Bandwidth (44nm) Chirped Fibre Gratings and Narrow Bandpass Filters Produced by the Use of an Amplitude Mask", *Electronics Letters*, 30(11): 891–892 (May 26, 1994).

Hill, K.O. et al., "Chirped in–Fiber Bragg Gratings for Compensation of Optical–Fiber Dispersion", *Optical Society of America*, 19(17):1314–1316 (Sep. 1, 1994).

Ouellette, F. et al., "Broadband and WDM Dispersion Compensation Using Chirped Sampled Fibre Bragg Grating", *Electronics Letters*,31(11): 899–901 (May 25, 1995).

Tohmori, Y. et al., "Broad–Range Wavelength–Tunable Superstructure Grating (SSC) DBR Lasers", *IEEE Journal of Quantum Electronics*, 29(6): 1817–1823 (Jun. 1993).

Supplementary European Search Report (Mar. 5, 1998).

V. Mizrahi, P. J. Lemaire, T. Erdogan, W.A. Reed, D.J. DiGiovanni and R. M. Atkins, "Ultraviolet laser fabrication of ultrastrong optical fiber gratings and of germania–doped channel waveguides", Appl. Phys. Lett. 63 (13), 27 Sep. 1993, pp. 1727–1729.

(List continued on next page.)

*Primary Examiner*—Martin Angebranndt
*Attorney, Agent, or Firm*—Merchant, Gould, Smith, Edell, Welter & Schmidt, P.A.

[57] ABSTRACT

An optical grating is formed by exposing linearly spaced regions of an optical fibre (10), typically a germanosilicate core fibre, to UV irradiation to produce spaced apart regions (12 and 13) of differing refractive index within the core (11) of the fibre. The grating characteristics are modified to create a relatively complex structure, for example a pi- shifted distributed phase structure, by post-processing the grating. This is achieved by exposing at least one concomitant region (14) of the grating to localised UV irradiation.

21 Claims, 5 Drawing Sheets

OTHER PUBLICATIONS

K.O. Hill, B. Malo, F. Bilodeau, D.C. Johnson and J. Albert, "Bragg gratings fabricated in monomode photosensitive optical fiber by UV exposure through a phase mask" Applied Physics Letters, 62, 1035–1037 (Mar. 1993).

R.C. Alferness, C.H. Joyner, M.D. Divino, M.J.R. Martyak and L.L. Buhl, "Narrowband grating resonator filters in InGaAsP/InP waveguides" Applied Physics Letters, 49 125–127 (Jul. 1986).

S. Legoubin, E. Fertein, M. Douay, P. Bernage, P. Niay, F. Bayon and T. Georges, "Formation of Moire grating in core of germanosilicate fibre by transverse holographic exposure method" Electronic Letters, 27, 1945–1946 (Oct. 1991).

M. Yamada and K. Sakuda "Analysis of almost–periodic distributed feedback slab waveguides via a fundamental matrix approach" Applied Optics, vol. 26, No. 16 3474–3478 (Aug. 1987).

J. Canning and M. Sceats "$\pi$–phase shifted periodic distributed structures in optical fibres by UV post–processing" Electronics Letters, 30, 1344–1345 (Aug. 1994).

International Search Report, International Application No. PCT/AU 95/00069 dated Jun. 1, 1995.

Fertein et al., Electron. Lett., vol. 27(20) pp. 1838–1839, Sep. 1991.

OPTICAL GRATING

TECHNICAL FIELD

This invention relates to an optical grating, that is to a light transmitting device having periodic or aperiodic regions of differing refractive index in the direction of light propagation. The invention has particular application to optical fibres and is hereinafter described in the context of germanosilicate core fibres. However, it will be understood that the invention does have broader application, for example to planar waveguides and other light transmitting devices.

BACKGROUND ART

The first optical grating or so-called Bragg grating was made in 1978 using the standing wave pattern originating from two counter-propagating beams in a Gedoped core optical fibre. Since that time techniques have been developed to exploit the inherent photosensitivity of germanosilicate fibres, the photosensitivity being established by the bleaching of oxygen deficient centres by UV light to create the regions of differing refractive index. The refractive index change which is induced by the UV light arises from the creation of polarisable colour centres and structural rearrangement of the glass network.

Currently the most popular method of creating an optical grating involves so-called side-writing of a length of optical fibre using the holographic fringe pattern of two interfering UV beams. Side-writing of simple uniform periodic structures having a length in the order of about 1 cm with reflectivities approaching 100% and bandwidths greater than 1 nm has become an established practice, and attention is now shifting to the fabrication of complex grating structures for specific applications.

Side-writing of optical fibres by a recently developed point-by-point process has facilitated the fabrication of arbitrary phase gratings, and the employment of phase masks has been proposed for use in the side-writing of non-uniform gratings such as phase shifted and chirped gratings.

DISCLOSURE OF THE INVENTION

The present invention is directed to an alternative process for use in the creation of complex gratings and it stems from the discovery that grating characteristics may be modified to achieve a desired result by subjecting a grating structure to pre-processing or post-processing.

Thus, the present invention provides a method of forming an optical grating which comprises the steps of:

(a) exposing linearly spaced regions of a glass light transmitting device to optical irradiation, the regions being spaced apart in the direction of intended light propagation through the device, and (b) either prior to or following exposure of the linearly spaced regions, exposing at least one concomitant region of the device to optical irradiation.

The optical irradiation used for exposing both the linearly spaced regions and the concomitant region(s) has an intensity, dose level and wavelength appropriate to cause a localised increase in the refractive index of the device in the exposed regions.

The invention also provides an optical device which comprises or incorporates a grating produced by the above defined method. A complex grating may be so produced, for example a π-shifted distributed phase structure of the type required for a DFB laser.

The glass light transmitting device which is exposed to the optical irradiation preferably comprises an optical fibre and most preferably comprises a germanosilicate core optical fibre. However, any light transmitting device or any optical fibre having a core which exhibits photosensitivity may be employed. Thus, the present invention has application to the formation of a grating in any photosensitive light transmitting material within a waveguide. Germanium is recognised as being the leading photosensitive material and it is for this reason that the invention is most preferably directed to the formation of a grating within a germanosilicate core optical fibre. Co-doped optical fibres may also be employed, for example a germanium doped fibre core containing phosphorous and/or rare earths such as erbium and neodymium. The latter optical fibre has particular relevance in the development of lasing structures within a grating.

The optical grating is preferably formed by exposing the concomitant region(s) as a secondary step, that is following exposure of the linearly spaced regions. The secondary step thus may be referred to as a post-processing operation.

The linearly spaced regions may be uniformly spaced so as to form a periodic structure which effectively is made non-uniform or complex by irradiation of the concomitant region(s).

The intensity, dose level and wavelength of the optical irradiation will be dependent upon the structural changes to be made in the exposed regions and the characteristics of the material to be subjected to the radiation. The wavelength of the radiation will be selected according to the chemical composition and/or doping of the light transmitting device. In the case of a germanium doped device the wavelength of the radiation will be selected to be in the order of 240 nm, and the wavelength selected for other materials will be determined by the absorbency of the material. The intensity and dose level of the radiation will be selected to create the required degree of structural change within a given material, with the upper limit being chosen normally to avoid fracturing the glass or, if appropriate, to control the degree of required fracturing.

In raising the refractive index generally within the localised region of the previously created uniform grating structure, a transmitted light signal will develop a retarded propagation. When the concomitant region of the device is located between the ends of the previously created uniform grating structure, two gratings will effectively be produced which are out of phase with one another and which act as a wavelength selective Fabry-Perot resonator which allows light at resonance to penetrate the stop-band of the original (uniform) grating.

The method of the present invention, when used to introduce phase shifts which influence transmission and conversely reflection spectra, offers versatility and a potential for use in modifying spectral properties in more complex ways. The process in accordance with the present invention permits trimming of a grating structure and facilitates in-situ trimming of a grating. Trimming of the structure may be observed in-situ and any necessary adjustments may be made easily and quickly.

Applications of the invention include the production of very narrow band transmission and reflection filters. However, the method of the present invention has further applications, including the manufacture of "comb" gratings and "chirped phase shift" gratings. In the case of the comb gratings a series of phase shifts may be introduced into a grating given a sufficiently long bandwidth by adjusting different phase shifts at different locations along the grating. In the case of the proposed chirped phase shift gratings, these may be achieved by exposing a plurality of overlapping regions in a previously formed uniform grating, positioning the further region strategically along the grating.

The invention will be more fully understood from the following description of a preferred method of forming an optical grating within an optical fibre, the description being provided with reference to the accompanying drawings.

MODE FOR CARRYING OUT THE INVENTION

Figure 1:
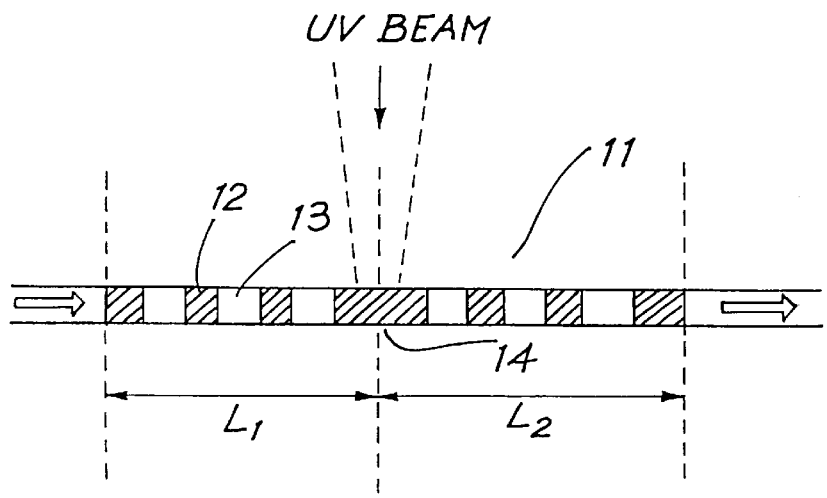
FIG. 1 shows a portion of the length of the core of an optical fibre and illustrates in an idealised way the post-processing of a uniform grating structure.

An optical fibre 10 that is to carry the grating structure comprises a 10 $\mu$m diameter germanosilicate core and a 125 $\mu$m diameter substantially pure silica cladding. FIG. 1 shows a magnified view of a portion of the fibre core 11 in which the grating is formed.

A substantially uniform grating is formed initially within the core 11 by UV irradiation, using the holographic fringe pattern of two interfering beams, and the uniform grating is constituted by periodic, linearly spaced regions 12 and 13 of alternatingly high and low refractive index extending in the direction of light propagation. The grating as initially formed has a total length $L_1+L_2$ as required but typically in the order of 10 mm.

The grating constituted by the linearly spaced regions 12 and 13 is subjected to post-processing in one concomitant region 14, at the junction of the two grating portions indicated by the length $L_1$ and $L_2$, by exposing the grating to localised UV irradiation as indicated in FIG. 1. However, it will be understood that other post-processing operations may be performed to produce different structures, including for example structures in which two or more concomitant regions of the grating are exposed to further, localised irradiation and including structures in which a region 12 of "high" refractive index is irradiated to further increase the depth of refractive index modulation in that region. Also, it would be understood that similar structures may be achieved by subjecting the fibre 10 to pre-processing at region 14 by a localised UV beam and thereafter exposing the fibre to UV irradiation in a manner to form the linearly spaced regions 12 and 13 of alternatingly high and low refractive index. In either case (i.e., whether the localised irradiation is effected as a pre-processing or a post-processing operation), the localised irradiation is effected at least in part within the zone of the existing or intended linearly spaced regions 12 and 13. Thus, the localised irradiation is referred to herein as being for the purpose of exposing at least one concomitant region of the linearly spaced regions.

Figure 2:
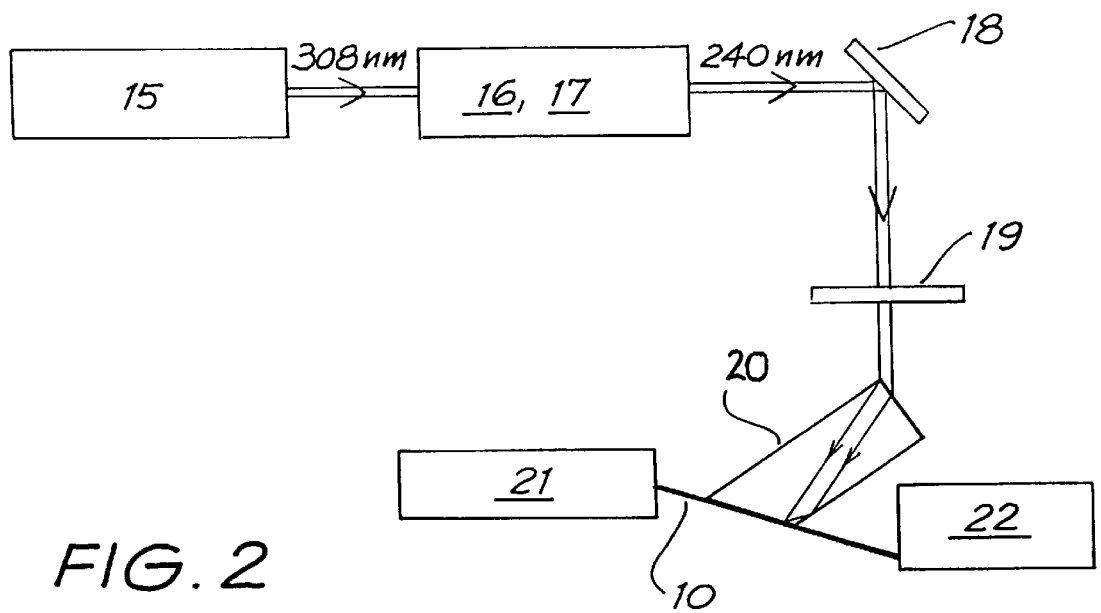
FIG. 2 shows an apparatus which is employed for side-writing a uniform grating structure into the core of the optical fibre.

The uniform grating structure, which precedes the post-processing shown in FIG. 1, is created using the apparatus of FIG. 2. As illustrated, a 308 nm output (approximately 10 ns pulses) from an excimer laser 15 is used for pump a dye laser 16 producing 10 ns pulses at 480 nm. The output from the dye laser 16 is passed through a frequency doubling crystal 17 to produce pulses at 240 nm wavelength.

The output from the crystal 17 is reflected by a mirror 18 and passed through a cylindrical lens 19 such that its focal line is positioned at the output end of a prism interferometer 20. The prism interferometer produces a fringe pattern on this focal line and adjustment of the prism angle is effected to select the appropriate Bragg wavelength, this typically being in the order of 1550 nm.

The fibre 10 is stripped of its normal protective coating for a distance at least as long as the grating to be written, is placed along the focal line and is mounted in position using magnetic holders (not shown) so that it is maintained under a slight tension. The fibre 10 is located in front of the prism face without quite touching the face, and alignment with the focal line of the interference fringe is achieved by obtaining diffraction patterns at each end of the fringe when it strikes the core. The alignment procedure that is adopted is substantially the same as that employed in any interferometer which conventionally is used in the side-writing of optical fibre cores.

The fringe pattern then imprints a grating structure into the fibre core and this is monitored using a broadband source 21 at the Bragg wavelength selected for the grating on a spectrum analyser 22.

The procedure and apparatus described thus far for producing a uniform grating structure correspond in substance with the procedures and apparatus which conventionally are employed for side-writing prior art gratings. Alternative procedures that may be employed could involve the use of a narrow line width Excimer laser operating at 248 nm to write gratings directly, this providing a greater energy availability for use in writing Type II gratings. Also, any interference structure might be employed to produce the required interference pattern, for example a beam splitter used with two mirrors or, as hereinafter described, a phase mask.

Figure 3:
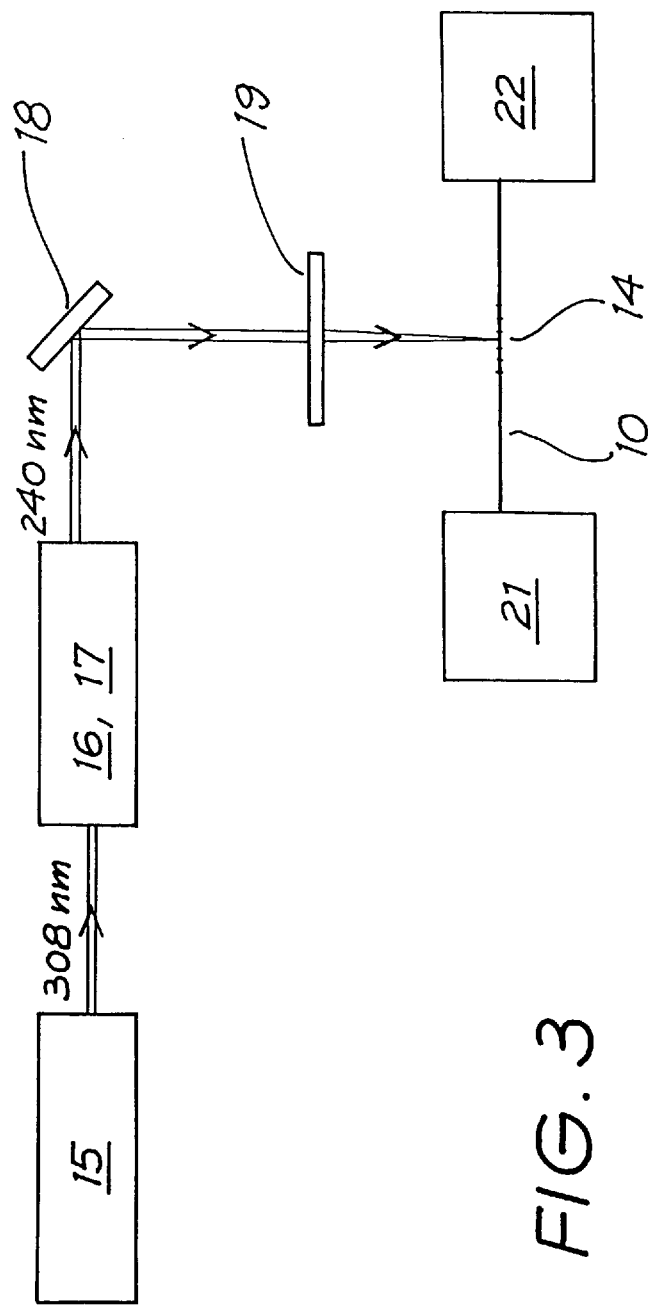
FIG. 3 shows an apparatus which is employed for post-processing the structure which is created in use of the apparatus of FIG. 2.

In order to effect the post-processing a modified form of the above described laser system may be employed, as shown in FIG. 3. However, in the post-processing operation the 240 nm output from the cylindrical lens 18 is focused directly onto the optical fibre 10 but with the focal line of the cylindrical lens located at 90° relative to the fibre axis.

The post-processing is effected using the apparatus of FIG. 3 whilst monitoring the appearance and movement of the phase shift dip on the spectrum analyser 21, again using the broadband source 20. As stated previously, the post-processing may be effected in one region only, as indicated in FIG. 1, or at various regions within the uniform grating structure in order to produce a series of phase shifts in propagated light.

Figure 4:
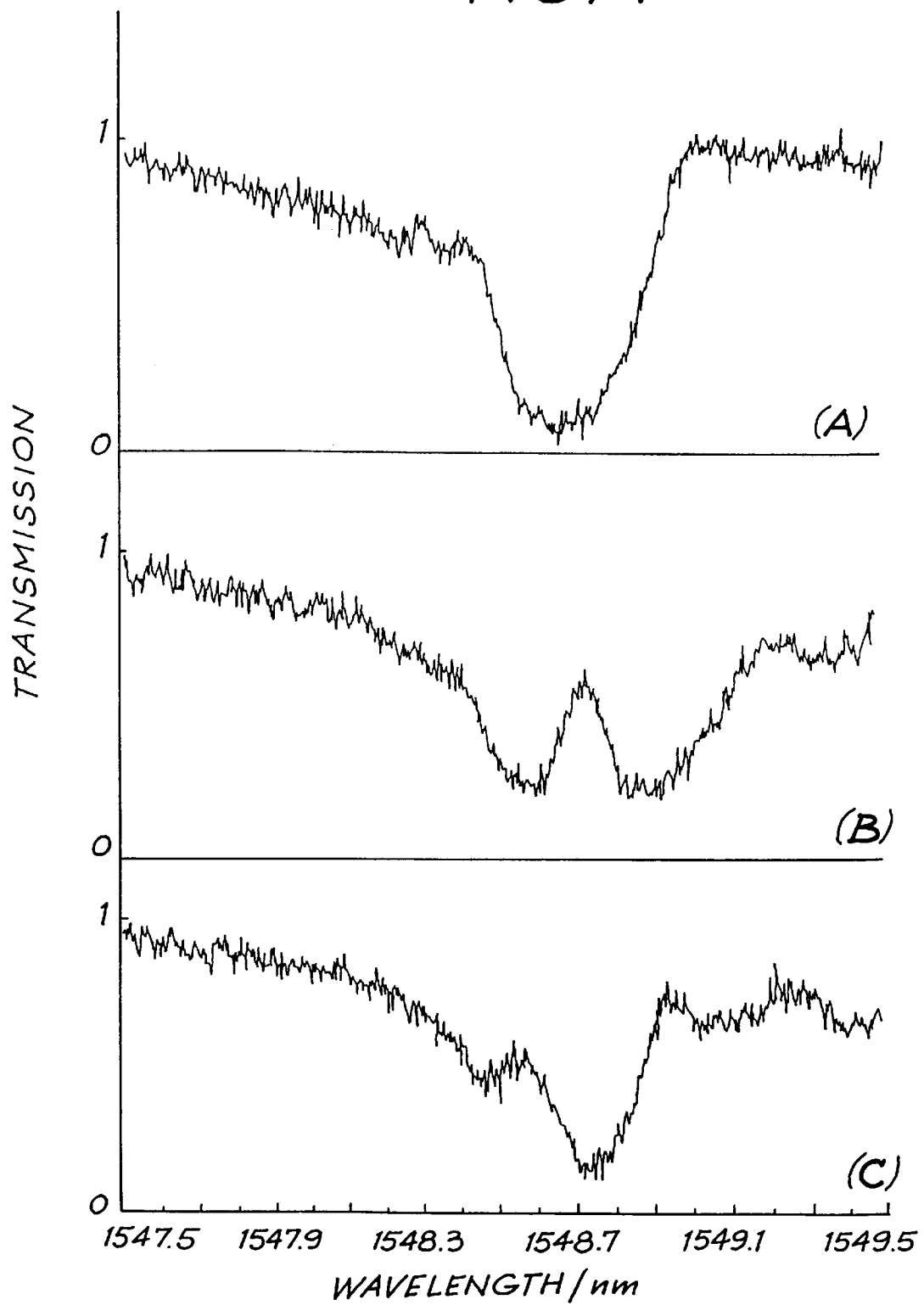
FIG. 4 shows graphs of normalised transmission spectra of an optical grating produced by the apparatus of FIGS. 2 and 3—(A) prior to post-processing, (B) during post-processing and (C) following post-processing.

The results of monitoring the transmission spectrum are shown in the graphs of FIG. 4. During post-processing and after approximately $2.5 \times 10^4$ shots the desired result was obtained. A transmission peak at 1548.7 nm appears in the centre of the reflection band corresponding to the formation of a Fabry-Perot-like resonator structure. After a further $2 \times 10^4$ shots this peak has moved to the lower wavelength side at 1548.5 nm.

Figure 5:
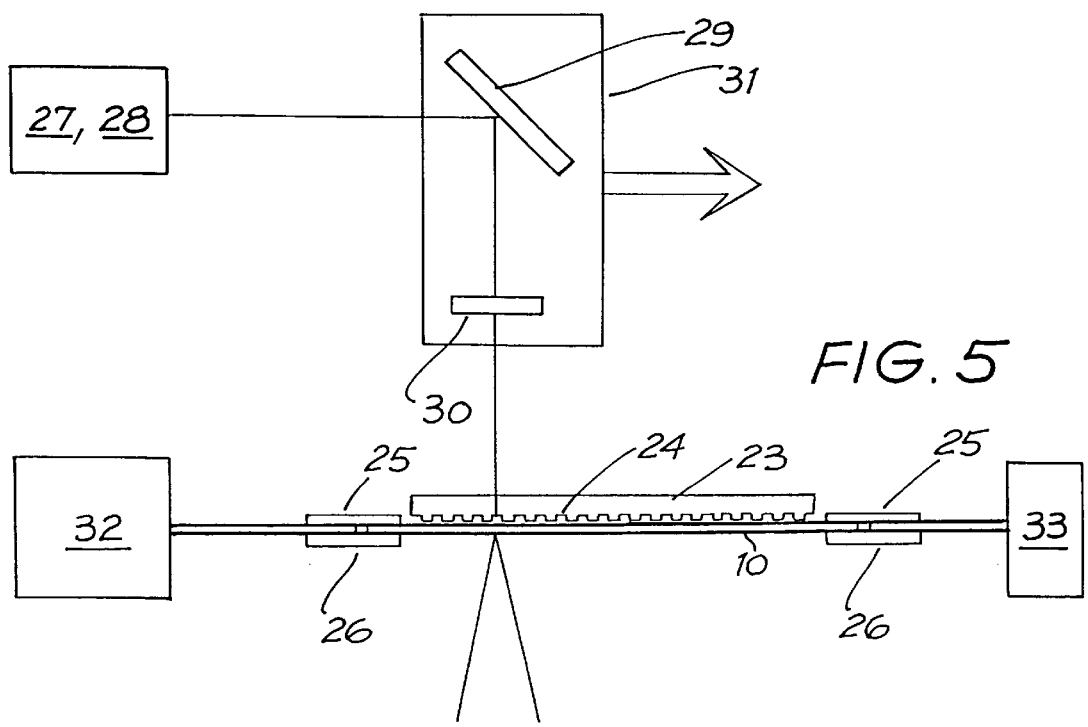
FIG. 5 shows an alternative form of apparatus which is employed for side-writing a uniform grating structure into the core of the optical fibre.
Figure 6:
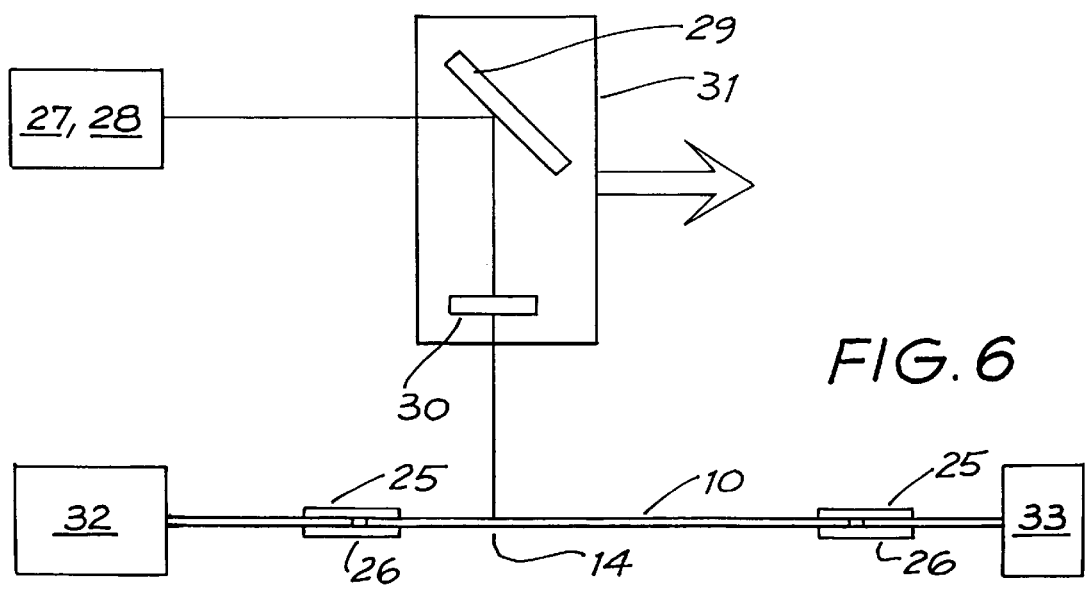
FIG. 6 shows an apparatus which is employed for post-processing the structure which is created in use of the apparatus of FIG. 5, and FIGS. 7A and 7B show graphs of transmission spectra of an optical grating produced by the apparatus of FIGS. 5 and 6—(A) prior to post-processing, and (B) following post-processing.

Reference is now made to FIGS. 5 and 6 of the drawings, which show alternative forms of apparatus that are employed for side-writing the uniform grating structure into the core of the optical fibre 10 and for post-processing the structure which is created in use of the apparatus of FIG. 5.

As illustrated in FIG. 5, a phase mask 23 is arranged to diffract UV light at 240 nm, mostly in the +1 and −1 orders of diffraction, and it comprises a silica mask having 1 mm long parallel grooves 24 which are spaced apart with a period of 1.06 $\mu$m, assuming that the uniform grating is to have an axial period P of 530 $\mu$m to produce a Bragg reflection peak centred on $\lambda_B$ of 1.535 $\mu$m. The grooves 24 within the phase mask 23 are etched to a depth of approximately 240 $\mu$m, and the grooves extend in a direction perpendicular to their length over a distance exceeding the length of grating that is to be written using the phase mask.

As in the previously described embodiment of the invention, when forming the grating, the fibre 10 is first stripped of its protective coating for the required distance, and the fibre is placed directly behind the phase mask 23 such that the axis of the fibre is perpendicular to the grooves 24 within the phase mask. The fibre 10 is laid in V grooves 25 and is held by magnets 26, so that it is maintained under slight tension.

A laser beam having wavelength 240 $\mu$m is generated by a frequency doubled Coumarin dye laser 27 pumped at 308 nm from an XeCl Excimer laser 28. The laser beam is pulsed at 20 Hz with a pulse fluence of 1 mJ/cm$^2$ over 36,000 shots.

The laser beam is directed onto the optical fibre 10 by way of the phase mask 23, the beam being deflected by a mirror 29 and focused by way of a fused silica cylindrical lens 30 which is located with its axis perpendicular to the fibre axis and, although not so shown in the drawings, positioned so as to produce a line focus along the fibre core.

The mirror 29 and lens 30 are both mounted to a carriage 31 in such a way that they may be moved as a unit in a direction parallel to the fibre axis. Thus, the focused, deflected beam from the laser is translated along the fibre by movement of the carriage 31 and is aligned in a way such as always to be incident with the same power density on the core of the fibre.

When writing the grating the carriage 31 is moved in the direction of the arrow shown in FIG. 5 at a substantially constant velocity to create a uniform grating; and the grating is written into the fibre core as a consequence of the interference pattern created by the UV beam as diffracted by the phase mask.

Figure 7A:
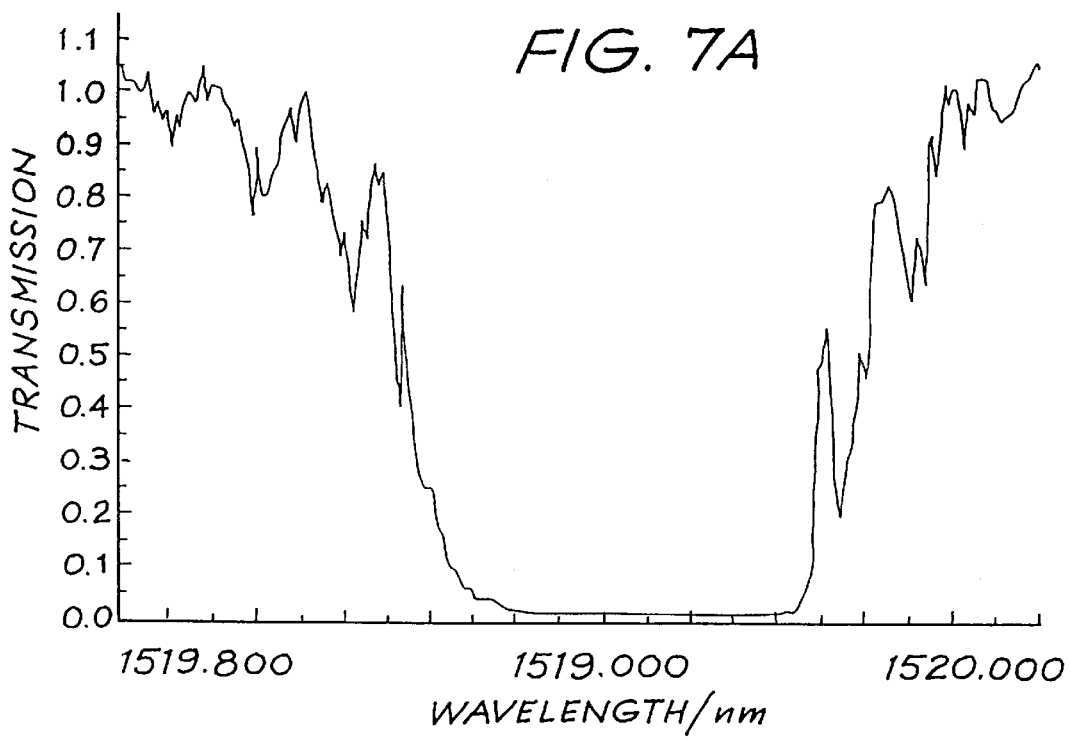

Writing the grating is monitored using a source 32 (comprising a Hewlett-Packard 8168A tunable singlemode laser with a resolution of 0.001 nm, centred on 1520 nm) and a spectrum analyser 33, and the transmission spectrum as shown in FIG. 7A is obtained prior to post-processing the uniform grating.

Having produced the uniform grating structure, post-processing is effected using the apparatus of FIG. 5 but modified as shown in FIG. 6 so that the 240 nm output from the cylindrical lens 19 is focused directly onto the optical fibre 10, with the focal line of the cylindrical lens located at 90° relative to the fibre axis. The beam is focused onto the centre 14 of the grating, over a length of approximately 1 mm, as formed in the apparatus of FIG. 5.

Figure 7B:
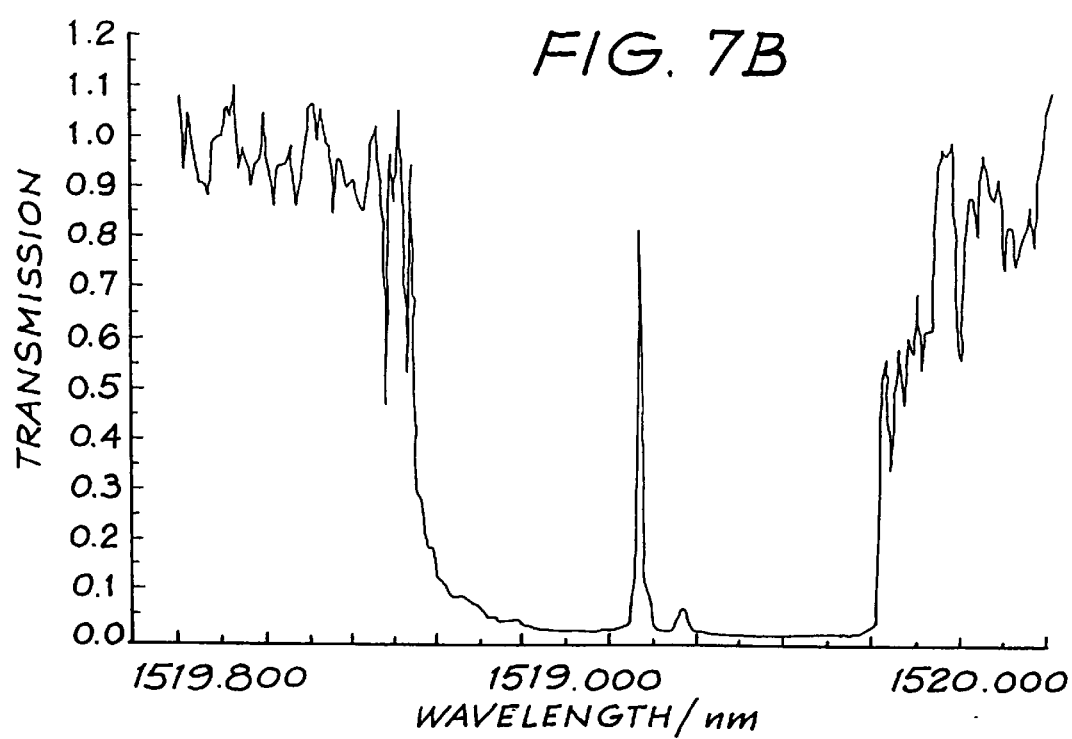

During continuing post-processing of the grating structure the transmission spectrum is monitored and a transmission spike may be observed to grow in the reflection bandwidth, to establish the transmission spectrum of FIG. 7B.

Variations and modifications may be made in respect of the procedure and apparatus described above whilst falling within the scope of the following claims.

We claim:

1. A method of forming an optical grating which comprises the steps of:
    (a) forming a first grating structure by exposing substantially equally linearly spaced regions of a glass light transmitting device to optical irradiation, the regions being spaced apart in the direction of intended light propagation through the device, said optical irradiation having an intensity, dose level and wavelength appropriate to cause a localised increase in the refractive index of the device in said exposed regions; and
    (b) either prior to or following exposure of the linearly spaced regions, individually exposing a concomitant region or contiguous group of concomitant regions of the grating structure to optical irradiation localised only to said concomitant region or said contiguous group of regions, the optical irradiation having a substantially uniform magnitude across said concomitant region(s) and having an intensity, dose level and wavelength appropriate to cause a localised increase in the refractive index of the device substantially only in said concomitant region or group of regions so as to divide said grating structure into at least two smaller grating structures separated by said concomitant region(s).

2. The method as claimed in claim 1 wherein the light transmitting device is in the form of an optical fibre and the grating is formed within the fibre core.

3. The method as claimed in claim 2 wherein the linearly spaced regions and the concomitant region(s) are exposed to UV irradiation.

4. The method as claimed in claim 2 wherein exposure of the or each concomitant region to the irradiation is effected by way of a post-processing operation, following exposure of the linearly spaced regions and creation of regions of alternatingly high and low refractive index in the direction of propagation of light through the device.

5. The method as claimed in claim 1 wherein the linearly spaced regions and the concomitant region(s) are exposed to UV irradiation.

6. The method as claimed in claim 5 wherein exposure of the or each concomitant region to the irradiation is effected by way of a post-processing operation, following exposure of the linearly spaced regions and creation of regions of alternatingly high and low refractive index in the direction of propagation of light through the device.

7. The method as claimed in claim 1 wherein exposure of the or each concomitant region to the irradiation is effected by way of a post-processing operation, following exposure of the linearly spaced regions and creation of regions of alternatingly high and low refractive index in the direction of propagation of light through the device.

8. The method as claimed in claim 2 wherein the or each concomitant region is exposed to the irradiation at a location intermediate the extremities of the linearly spaced regions.

9. The method as claimed in claim 8 wherein a single concomitant region is exposed to the irradiation at a localised region that bridges adjacent regions of relatively high refractive index.

10. The method as claimed in claim 8 wherein the or each concomitant region is exposed to irradiation at a level sufficient to establish a relatively narrow transmission region in the reflection bandwidth attributable to the grating.

11. The method as claimed in claim 10 wherein the linearly spaced regions of alternatingly high and low refractive index are created by exposing the optical device to the holographic fringe pattern of two interfering beams.

12. The method as claimed in claim 9 wherein the or each concomitant region is exposed to irradiation at a level sufficient to establish a relatively narrow transmission region in the reflection bandwidth attributable to the grating.

13. The method as claimed in claim 8 wherein the linearly spaced regions of alternatingly high and low refractive index are created by exposing the optical device to the holographic fringe pattern of two interfering beams.

14. The method as claimed in claim 7 wherein the linearly spaced regions of alternatingly high and low refractive index are created by exposing the optical device to the holographic fringe pattern of two interfering beams.

15. The method as claimed in claim 14 wherein the fringe pattern is established by use of a phase mask.

16. The method as claimed in claim 15 wherein the or each concomitant region is irradiated by focusing a beam directly onto the optical fibre.

17. The method as claimed in claim 14 wherein the or each concomitant region is irradiated by focusing a beam directly onto the optical fibre.

18. A method as claimed in claim 1 wherein said method is utilised to produce an optical device having a phase shifted grating.

19. A method as claimed in claim 1 wherein said grating structure is a chirped grating structure.

20. A method as claimed in claim 1 wherein said optical grating forms a pi-shifted distributed phase structure.

21. An optical device incorporating a grating when formed by the method as claimed in claim 1.

* * * * *